United States Patent [19]
Furukawa et al.

[11] Patent Number: 6,108,548
[45] Date of Patent: *Aug. 22, 2000

[54] MOBILE STATION AND SOFT HANDOFF METHOD

[75] Inventors: Hideto Furukawa; Yasuyuki Oishi; Kazuo Nagatani; Yoshiharu Tajima; Hidenobu Fukumasa, all of Kawasaki, Japan

[73] Assignee: Fujitsu Limited, Kanagawa, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/924,051

[22] Filed: Aug. 28, 1997

[30]     Foreign Application Priority Data

Mar. 19, 1997  [JP]  Japan ................................... 9-065679

[51] Int. Cl.⁷ ................................................. H04Q 7/32
[52] U.S. Cl. .......................... 455/442; 455/550; 455/134; 370/334
[58] Field of Search ...................................... 455/436, 437, 455/438, 439, 442, 101, 102, 132, 134, 133, 137, 140, 272, 273, 550; 370/331, 334

[56]     References Cited

U.S. PATENT DOCUMENTS

| 5,101,501 | 3/1992 | Gilhousen et al. | 455/442 |
|---|---|---|---|
| 5,267,261 | 11/1993 | Blakeney, II et al. | 455/442 |
| 5,444,766 | 8/1995 | Farwell et al. | 379/60 |
| 5,541,963 | 7/1996 | Nakagoshi | 375/347 |

*Primary Examiner*—Edward F. Urban
*Attorney, Agent, or Firm*—Helfgott & Karas, P.C.

[57]     ABSTRACT

A mobile station is provided which does not cause a reduction in the speech transmission capacity. Branches receive radio signals from base stations and operate independently of one another. A branch operation control section controls the operation of the individual branches to detect a destination-side base station based on the reception levels of signals from surrounding base stations, to cause part of the branches to establish synchronization of spreading code and carrier frequency with respect to the destination-side base station while causing the other part of the branches to maintain communication with a departure-side base station after the destination-side base station is detected, and to cut off the communication with the departure-side base station after the synchronization is established.

5 Claims, 10 Drawing Sheets

MOBILE STATION AND SOFT HANDOFF METHOD

BACKGROUND OF THE INVENTION

(1) Field of the Invention

The present invention relates to a mobile station and a soft handoff method, and more particularly, to a mobile station for performing communication in different cell environments and a soft handoff method for performing soft handoffs in different cell environments.

(2) Description of the Related Art

In recent years, mobile communication technique is switching from analog mobile communication to digital mobile communication with a view to enhancing the speech transmission capacity. Access procedures adopted in the digital mobile communication include TDMA (Time Division Multiple Access) in which users are allocated respective time slots sharing the same frequency, and CDMA (Code Division Multiple Access) utilizing spread spectrum communication technique. Currently, in view of further expansion of the speech transmission capacity, CDMA which permits a greater increase in the number of subscribers than TDMA is attracting attention as a key technology for the next-generation mobile communication.

Meanwhile, in the case where a mobile station moves beyond a cell during communication, it is necessary that the base station with which the mobile station is communicating be switched to the base station in the cell to which the mobile station is moving, in order to ensure continuous communication. This switching control is called handoff.

In CDMA in general, since adjacent cells can use the same carrier frequency, it is unnecessary to synchronize carrier frequency at the time of handoff, and only spreading code needs to be synchronized. Accordingly, near the boundary between cells, signals from a plurality of base stations can be received at the same time, thus making it possible to perform the function called soft handoff that cannot be achieved with mobile stations connected in multiple access mode according to TDMA. When adjacent base stations are to be switched as a mobile station moves, the soft handoff permits the switching to be carried out instantaneously without being noticed by the user. The soft handoff technique has great importance to data communication using portable telephones, rather than the communication of voice information only.

In the case of communication in multiple access mode according to CDMA, however, the carrier frequency of one mobile station is nothing but interference for other mobile stations, and the degree of the interference depends on the transmission power of the carrier frequency. Especially, in a cell environment called umbrella in which a macrocell and a microcell overlap each other, or in a cell environment such as a multicell environment, the interference wave can occasionally become too strong as compared with the target radio wave. This occurs, for example, in the case where a target base station is relatively distant from a mobile station while another base station transmitting the carrier frequency is situated very near the mobile station. Such an undesired wave from a near location causes remarkable level interference. Thus, in the cell environments mentioned above, different carrier frequencies must be used.

FIG. 10 is a diagram illustrating how soft handoff is conventionally performed in a cell environment using different carrier frequencies. Normal mode represents a time period in which no soft handoff takes place, and compression mode represents a time period in which soft handoff is performed. In the compression mode during the soft handoff period, received data RX is compressed to ½ as compared with data RX received in the normal mode, and using the time saved in this manner, soft handoff is performed through synchronization with a destination-side base station toward which the mobile station is moving. This time division process permits simultaneous communication.

However, the soft handoff mentioned above is susceptible to interference because the spread ratio is ½. If the transmission power is doubled to compensate for the drawback, then other mobile stations are subject to interference, entailing a consequent reduction in the speech transmission capacity.

Further, in the case where the reception levels of signals from surrounding base stations are measured by the time division process as described above, a problem arises in that the speech transmission capacity further lowers.

SUMMARY OF THE INVENTION

An object of the present invention is to provide a mobile station permitting soft handoff to be performed without entailing a reduction in the speech transmission capacity.

Another object of the present invention is to provide a soft handoff method permitting soft handoff to be performed without entailing a reduction in the speech transmission capacity.

To achieve the first object, there is provided a mobile station for performing communication in different cell environments. The mobile station comprises a plurality of branches capable of receiving radio signals from base stations and operating independently of one another, and a branch operation control section for controlling operation of the branches to detect a destination-side base station based on reception levels of signals from surrounding base stations, to cause part of the branches to maintain communication with a departure-side base station while causing another part of the branches to establish synchronization of spreading code and carrier frequency with respect to the destination-side base station after the destination-side base station is detected, and to cut off the communication with the departure-side base station after the synchronization is established.

Also, to achieve the second object, there is provided a soft handoff method for performing soft handoff in different cell environments. This soft handoff method comprises the step of detecting a destination-side base station by a mobile station based on reception levels of signals from surrounding base stations, the step of notifying a radio channel control station of a soft handoff request from the mobile station via a departure-side base station, the step of notifying the destination-side base station of the soft handoff request and a spreading code allocated to the mobile station, from the radio channel control station, the step of causing the destination-side base station to prepare for transmission of the spreading code and a carrier frequency to establish a channel to the mobile station and for signal reception from the mobile station, the step of operating a plurality of branches in the mobile station independently of one another for receiving the spreading code and the carrier frequency from the destination-side base station, in such a manner that while part of the branches maintain connection with the departure-side base station, the other part of the branches initiate connection with the destination-side base station, the step of notifying the destination-side base station of establishment of synchronization of the spreading code and the carrier frequency and simultaneously causing the mobile station to resume diversity reception after the other part of the branches establish synchronization of the spreading code and the carrier frequency from the destination-side base station, the step of notifying the radio channel control station of the establishment of synchronization of the spreading code and the carrier frequency with respect to the mobile station, from the destination-side base station, and the step of notifying the departure-side base station of cutoff of the connection with the mobile station, from the radio channel control station.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
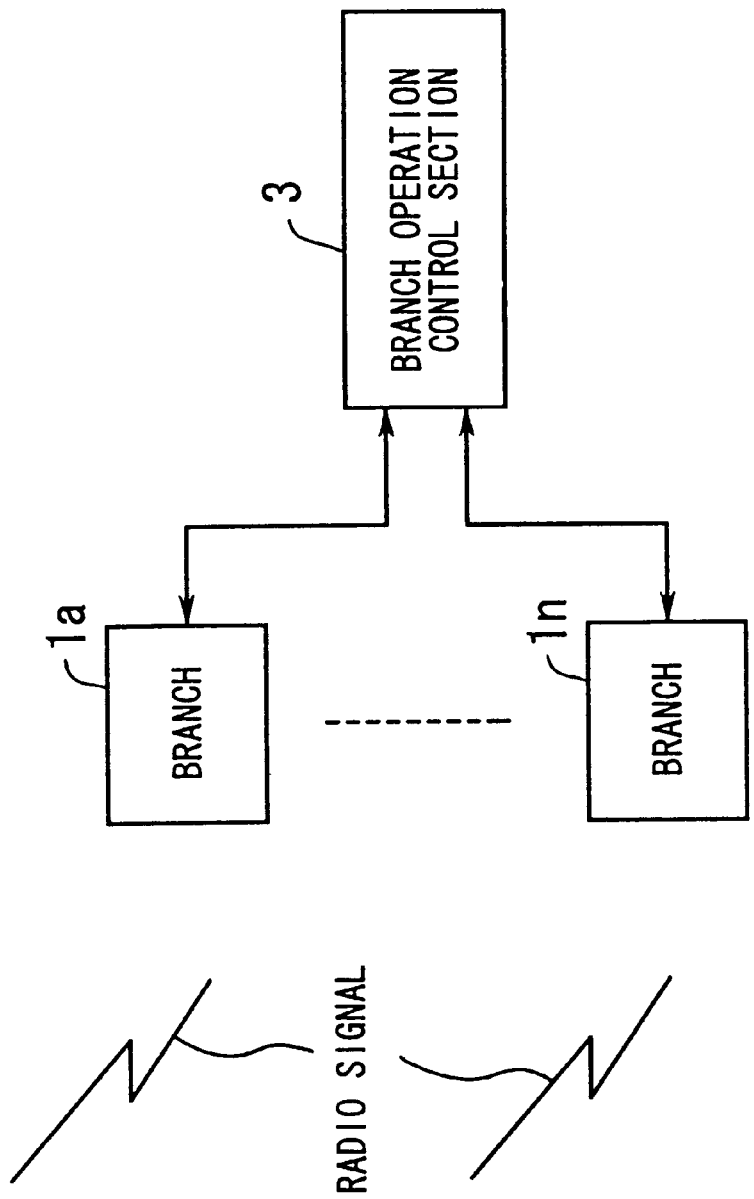
FIG. 1 is a diagram illustrating the principle underlying a mobile station according to the present invention.

Embodiments of the present invention will be hereinafter described with reference to the drawings. FIG. 1 is a diagram illustrating the principle underlying a mobile station according to the present invention. A plurality of branches 1a to 1n receive radio signals from base stations and operate independently of one another. A branch operation control section 3 detects a destination-side base station toward which the mobile station is moving, based on the reception levels of signals from surrounding base stations. After the destination-side base station is detected, the branch operation control section 3 controls part of the branches 1a to 1n so as to establish synchronization of spreading code and carrier frequency with respect to the destination-side base station, while controlling the other part of the branches so as to maintain the communication with a departure-side base station away from which the mobile station is moving. The branch operation control section 3 cuts off the communication with the departure-side base station after the synchronization is established.

The branches 1a to 1n operate independently of one another. The branch operation control section 3 controls the operation of the individual branches 1a to 1n. Each of the branches 1a to 1n has a plurality of correlators for measuring the power of surrounding communication base stations, measures the reception levels of signals from the surrounding base stations by means of the correlators, and detects, as the destination-side base station, a base station of which the reception level is the highest.

Figure 2:
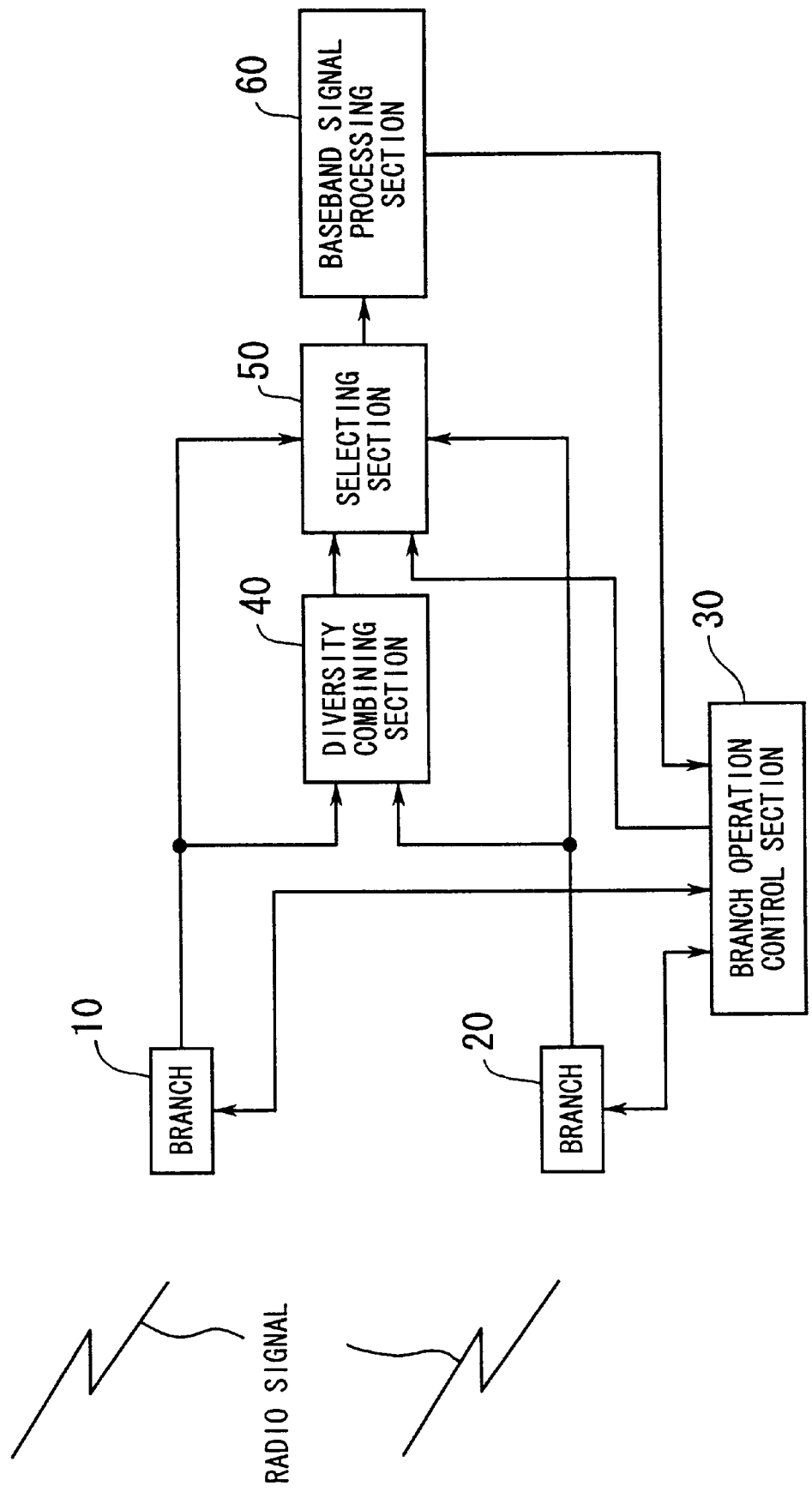
FIG. 2 is a diagram showing the arrangement of a mobile station having a dual system.

An embodiment wherein a mobile station has a dual branch system will be now explained. FIG. 2 is a diagram showing the arrangement of a mobile station with a dual branch system. The mobile station has a dual branch system including branches 10 and 20. A branch operation control section 30 controls the operation of the individual branches 10 and 20. A diversity combining section 40 receives demodulated signals demodulated in the branches 10 and 20 and subjects the received signals to diversity combining. A selecting section 50 selects a diversity combined signal which is the output of the diversity combining section 40, or the demodulated signal demodulated in only one of the branches 10 and 20, in accordance with a command from the branch operation control section 30. A baseband signal processing section 60 reproduces a baseband signal based on the signal selected by the selecting section 50, that is, based on the diversity combined signal or the demodulated signal demodulated in only one of the branches 10 and 20, and sends information about the destination-side base station, obtained from the baseband signal, to the branch operation control section 30.

The operation will be now explained. The branches 10 and 20 operate independently of each other. The branch operation control section 30 controls the operation of the individual branches 10 and 20. Each of the branches 10 and 20 has a plurality of correlators for measuring the power of surrounding communication base stations, measures the reception levels of signals from the surrounding base stations by means of the correlators, and detects, as the destination-side base station, a base station of which the reception level is the highest. The reception levels are measured periodically.

After the destination-side base station is detected, the branches 10 and 20 are controlled in such a manner that one of the branches 10 and 20 maintains the communication with the departure-side base station while the other of the branches 10 and 20 establishes synchronization of spreading code and carrier frequency with respect to the destination-side base station. Then, after the synchronization is established, the communication with the departure-side base station is cut off, and diversity reception is performed by the branches 10 and 20 to resume the communication now with the destination-side base station.

While diversity reception is performed by the branches 10 and 20, the diversity combining section 40 subjects the demodulated signals demodulated in the respective branches 10 and 20 to diversity combining and outputs the diversity combined signal. In accordance with a command from the branch operation control section 30, the selecting section 50 selects the diversity combined signal or the demodulated signal received and demodulated by only one of the branches 10 and 20 which are not performing diversity reception. The baseband signal processing section 60 reproduces the baseband signal based on the signal selected by the selecting section 50, that is, based on the diversity combined signal or the demodulated signal demodulated in only one of the branches 10 and 20. Information about the destination-side base station, obtained from the baseband signal, is sent to the branch operation control section 30.

Figure 3:
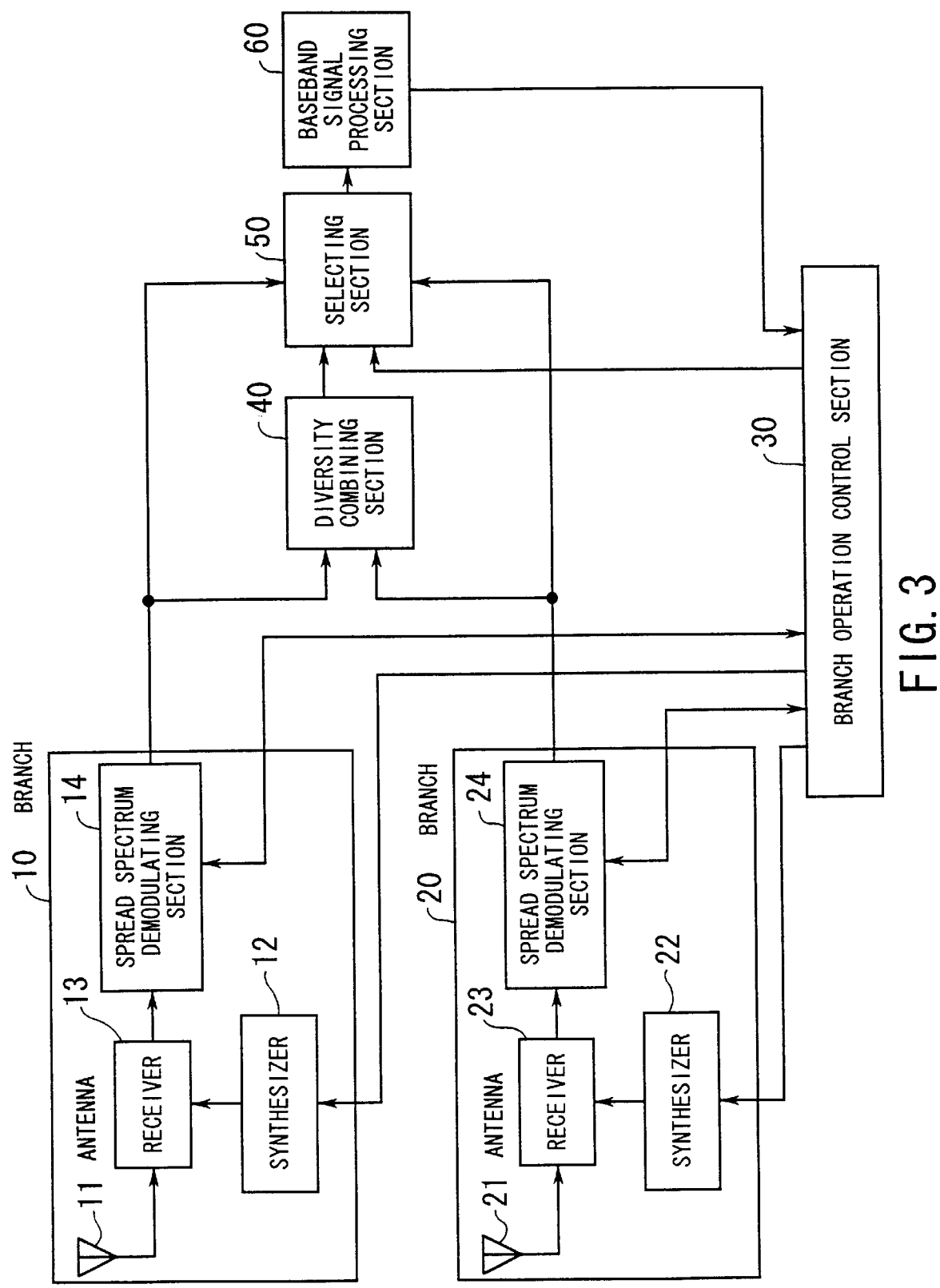
FIG. 3 is a diagram showing the arrangement of the mobile station in detail.

Referring now to FIG. 3, the arrangement of the mobile station will be explained in more detail. FIG. 3 is a diagram showing detailed arrangement of the mobile station. An antenna 11 receives a radio signal from a base station. A synthesizer 12 has a carrier frequency set therein by the branch operation control section 30, which carrier frequency was used for modulation by the base station, and outputs the set carrier frequency. A receiver 13 multiplies the radio signal received via the antenna 11 by the carrier frequency supplied from the synthesizer 12, thereby performing frequency conversion. A spread spectrum demodulating section 14 performs spread spectrum demodulation on an intermediate frequency output obtained as a result of the frequency conversion. Also, the spread spectrum demodulating section 14 is supplied with a control signal for measuring the reception levels of signals from surrounding base stations or for establishing synchronization of spreading code and carrier frequency, from the branch operation control section 30. The demodulated signal demodulated by the spread spectrum demodulating section 14 is supplied to the diversity combining section 40 as well as to the selecting section 50. The branch 20 has the same arrangement, and therefore, description thereof is omitted.

The spread spectrum demodulating sections 14 and 24 each include a DLL (Delay Locked Loop), not shown, for establishing synchronization of the spreading code, and an AFC (Auto Frequency Controller), not shown, for establishing synchronization of the carrier frequency.

The diversity combining section 40 receives the demodulated signals from the branches 10 and 20 and subjects the received signals to diversity combining. Specifically, the diversity combining section 40 detects the phase difference between the two demodulated signals demodulated by the spread spectrum demodulating sections 14 and 24, respectively, and generates a phase comparison voltage indicative of the phase difference. Based on the phase comparison voltage, the diversity combining section 40 shifts the phase of one demodulated signal appropriately so that the two demodulated signals may be in phase with each other, and combines the in-phase signals to generate a diversity combined signal.

On receiving a command from the branch operation control section 30, the selecting section 50 selects the diversity combined signal or the demodulated signal demodulated by only one of the spread spectrum demodulating sections 14 and 24. The baseband signal processing section 60 reproduces the baseband signal based on the signal selected by the selecting section 50, that is, based on the diversity combined signal or the demodulated signal demodulated by only one of the spread spectrum demodulating sections 14 and 24, and sends information about the destination-side base station, obtained from the baseband signal, to the branch operation control section 30. The baseband signal is sent to a voice codec or the like, not shown, for voice processing and is processed thereby.

Figure 4:
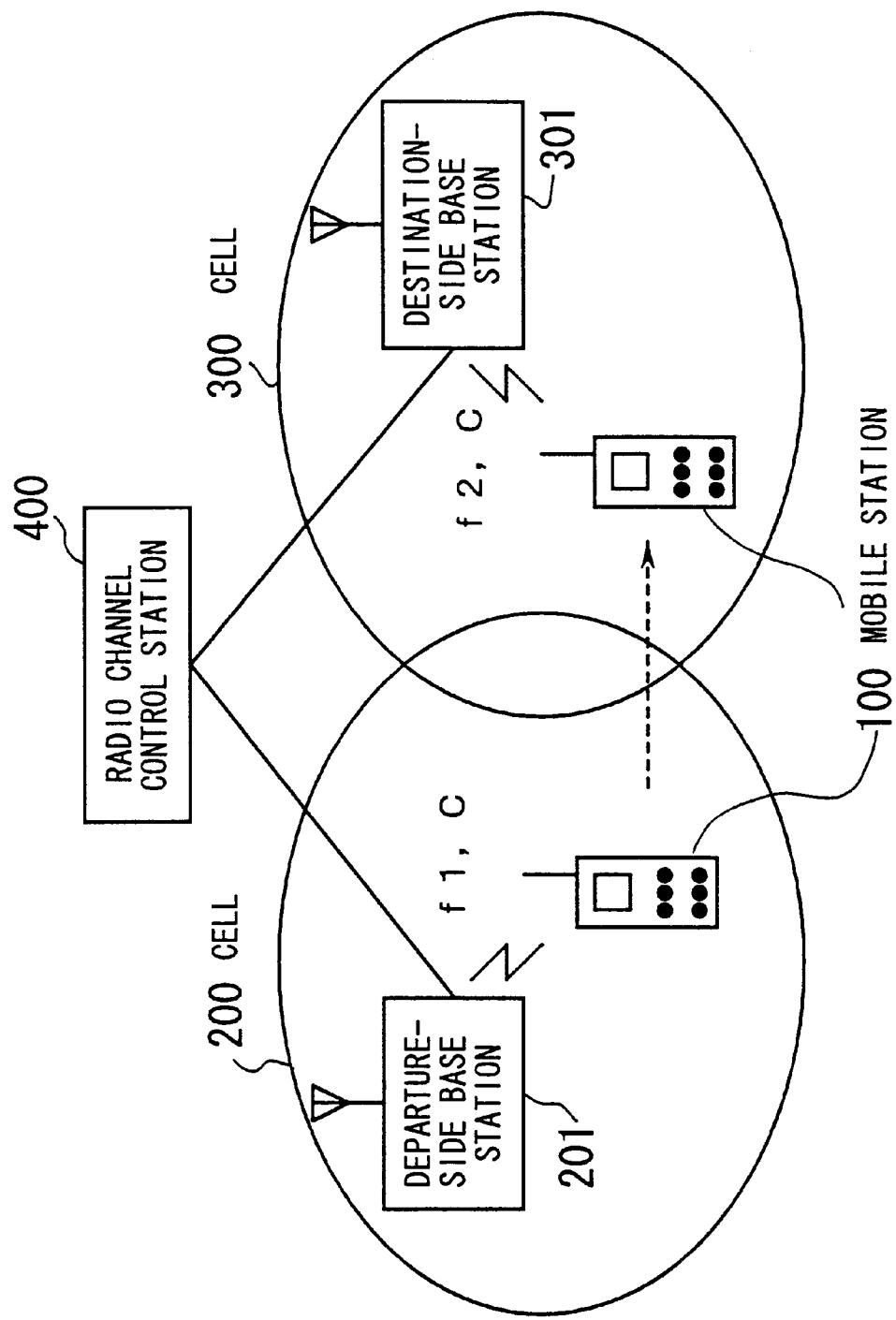
FIG. 4 is a conceptual diagram showing a cell environment in which soft handoff is performed between cells using different carrier frequencies.

The following is a description of a cell environment in which the mobile station according to the present invention undergoes a soft handoff between cells using different carrier frequencies. FIG. 4 is a conceptual diagram showing a cell environment in which soft handoff is performed between cells using different carrier frequencies. As such cell environment, cells 200 and 300 are located as illustrated. Assuming that a mobile station 100 moves from the cell 200 to the cell 300, a departure-side base station 201 and a destination-side base station 301 are situated in the cells 200 and 300, respectively. A radio channel control station 400 connects the departure- and destination-side base stations 201 and 301 and performs radio channel control.

The operation of the mobile station 100 in the cell environment described with reference to FIG. 4 will be now explained. When the mobile station 100 is present in the cell 200 and opens up communication, communication is established with a spreading code C and a carrier frequency f1 synchronized between the mobile station 100 and the departure-side base station 201. The mobile station 100 periodically measures reception levels, and as the mobile station 100 approaches the cell 300, it detects the destination-side base station 301 which is the base station showing the highest reception level. While maintaining the communication with the departure-side base station 201, the mobile station 100 establishes synchronization of the spreading code C and a carrier frequency f2 with the destination-side base station 301, and after the synchronization is established, the mobile station 100 cuts off the communication with the departure-side base station 201 and resumes the communication now with the destination-side base station 301.

Figure 5:
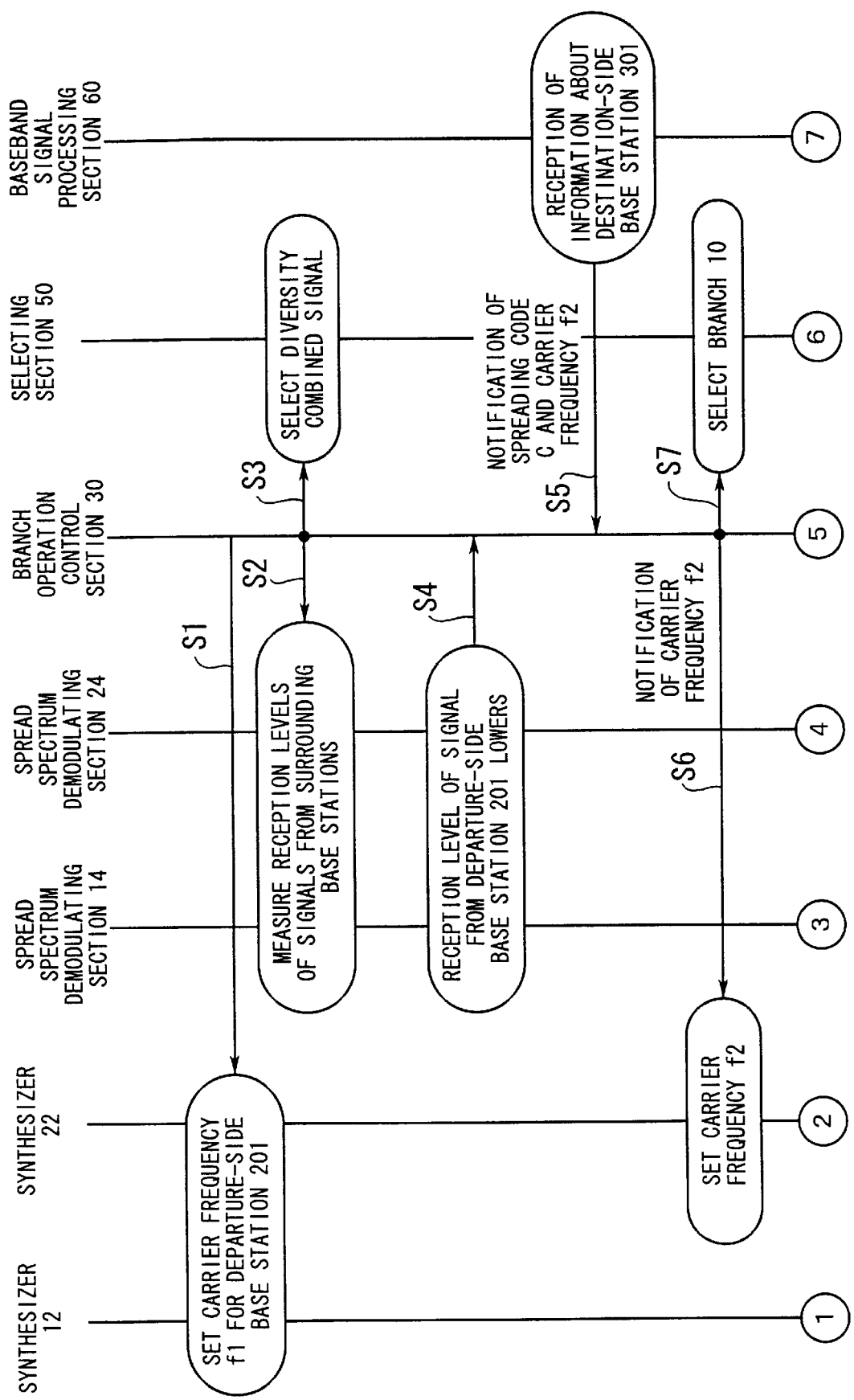
FIG. 5 is a first sequence diagram illustrating the operation of the mobile station.
Figure 6:
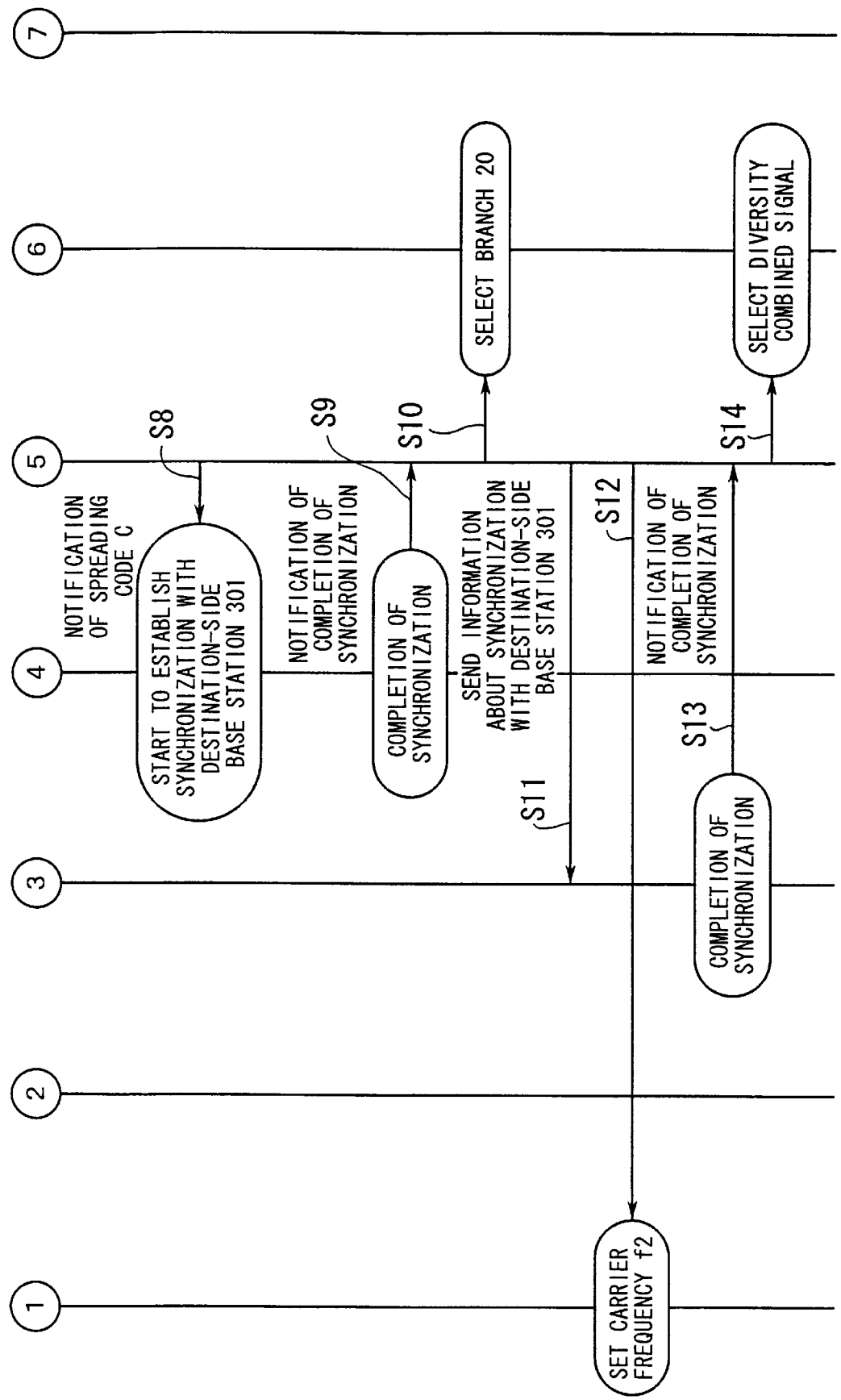
FIG. 6 is a second sequence diagram also illustrating the operation of the mobile station.

Referring now to FIGS. 5 and 6, the operation of the mobile station 100 will be explained in more detail. FIGS. 5 and 6 are sequence diagrams illustrating the operation of the mobile station 100. It is here assumed that the branch 20 detects the highest reception level, and also that at the time of soft handoff, the branch 10 maintains the communication with the departure-side base station 201 while the branch 20 establishes synchronization with the destination-side base station 301.

[S1] The branch operation control section 30 sets the carrier frequency f1 for the departure-side base station 201 in the synthesizers 12 and 22.

[S2] The branch operation control section 30 periodically sends a command to the spread spectrum demodulating sections 14 and 24 to measure the reception levels of signals from surrounding base stations.

[S3] The branch operation control section 30 sends a command to the selecting section 50 to select the diversity combined signal.

[S4] The spread spectrum demodulating sections 14 and 24 provide the branch operation control section 30 with information indicative of lowering of the reception level of the signal from the departure-side base station 201.

[S5] The baseband signal processing section 60 receives information about the destination-side base station 301, and provides the branch operation control section 30 with this information, that is, the spreading code C and the carrier frequency f2. At this point of time, soft handoff is initiated.

[S6] The branch operation control section 30 sets the carrier frequency f2 in the synthesizer 22.

[S7] The branch operation control section 30 sends a command to the selecting section 50 to select the demodulated signal demodulated by the branch 10.

[S8] The branch operation control section 30 notifies the spread spectrum demodulating section 24 of the spreading code C, whereupon the spread spectrum demodulating section 24 starts to establish synchronization with the destination-side base station 301.

[S9] After the synchronization is established, the spread spectrum demodulating section 24 notifies the branch operation control section 30 of completion of establishment of the synchronization.

[S10] The branch operation control section 30 sends a command to the selecting section 50 to select the demodulated signal demodulated by the branch 20.

[S11] The branch operation control section 30 provides the spread spectrum demodulating section 14 with information indicative of the synchronization with the destination-side base station 301.

[S12] The branch operation control section 30 sets the carrier frequency f2 in the synthesizer 12.

[S13] After synchronization is established, the spread spectrum demodulating section 14 notifies the branch operation control section 30 of completion of establishment of the synchronization.

[S14] The branch operation control section 30 sends a command to the selecting section 50 to select the diversity combined signal. At this point of time, handoff is terminated.

Although in the above description, diversity reception is performed by the branches 10 and 20 after the communication with the departure-side base station 201 is cut off, no diversity reception may be performed and communication may be resumed with the destination-side base station 301 by means of only one of the branches 10 and 20. In this case, it is unnecessary to provide the diversity combining section 40 and the selecting section 50, and the baseband signal processing section 60 may reproduce the baseband signal based on the demodulated signal demodulated by only one of the branches 10 and 20 to resume the communication.

As described above, in the mobile station 100 according to the present invention, the branch operation control section 30 controls the operation of a dual branch system, that is, the operation of the branches 10 and 20 independently of each other, the reception levels of signals from surrounding base stations are measured by means of a plurality of correlators, and after detecting the destination-side base station 301 which is the base station whose reception level is the highest, the branch 20 establishes synchronization with the destination-side base station 301 while the branch 10 maintains the communication with the departure-side base station 201. After the synchronization is established, diversity reception is performed. It is therefore possible to carry out soft handoffs without entailing a reduction in the speech transmission capacity.

Figure 7:
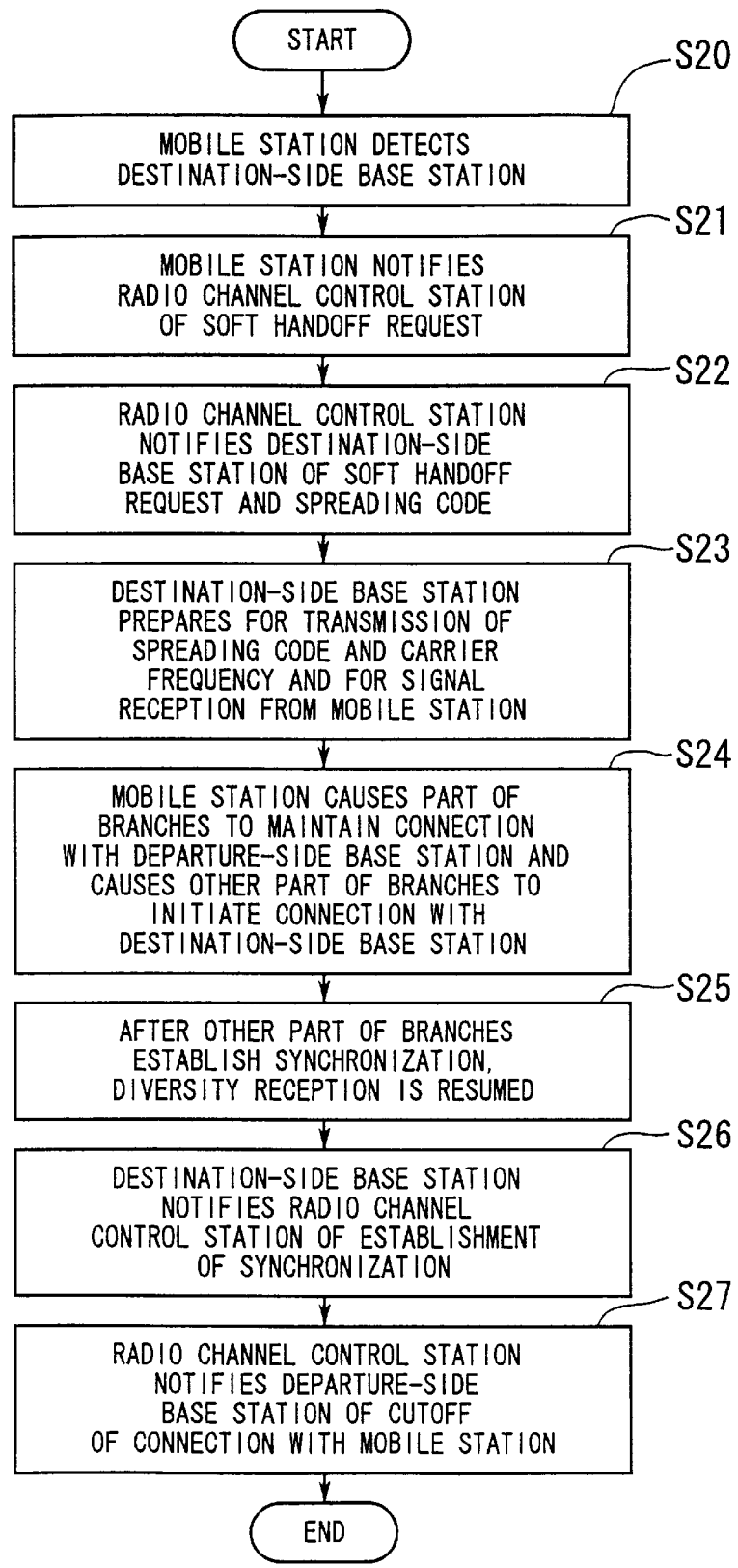
FIG. 7 is a flowchart showing the procedure for carrying out a soft handoff method according to the present invention.

A soft handoff method according to the present invention will be now described. FIG. 7 is a flowchart showing the procedure for carrying out the soft handoff method according to the present invention.

[S20] The mobile station 100 detects the destination-side base station 301. To detect the destination-side base station 301, the mobile station 100 measures the reception levels of radio signals from surrounding base stations and identifies, as the destination-side base station 301, a base station whose reception level is the highest.

[S21] The mobile station 100 notifies the radio channel control station 400 of a soft handoff request.

[S22] The radio channel control station 400 notifies the destination-side base station 301 of the soft handoff request and the spreading code.

[S23] The destination-side base station 301 prepares for the transmission of the spreading code and the carrier frequency in order to establish a channel to the mobile station 100, and for the reception of signal from the mobile station 100.

[S24] The mobile station 100 operates a plurality of branches independently of one another for receiving the spreading code and the carrier frequency from the destination-side base station 301, in such a manner that while part of the branches maintain their connection with the departure-side base station 201, the other part of the branches initiate connection with the destination-side base station 301.

[S25] After the other part of the branches establish synchronization of the spreading code and the carrier frequency with respect to the destination-side base station 301, the destination-side base station 301 is notified of establishment of the synchronization and at the same time the mobile station 100 resumes diversity reception.

[S26] The destination-side base station 301 notifies the radio channel control station 400 that the synchronization has been established.

[S27] The radio channel control station 400 notifies the departure-side base station 201 of the cutoff of the connection with the mobile station 100.

Figure 8:
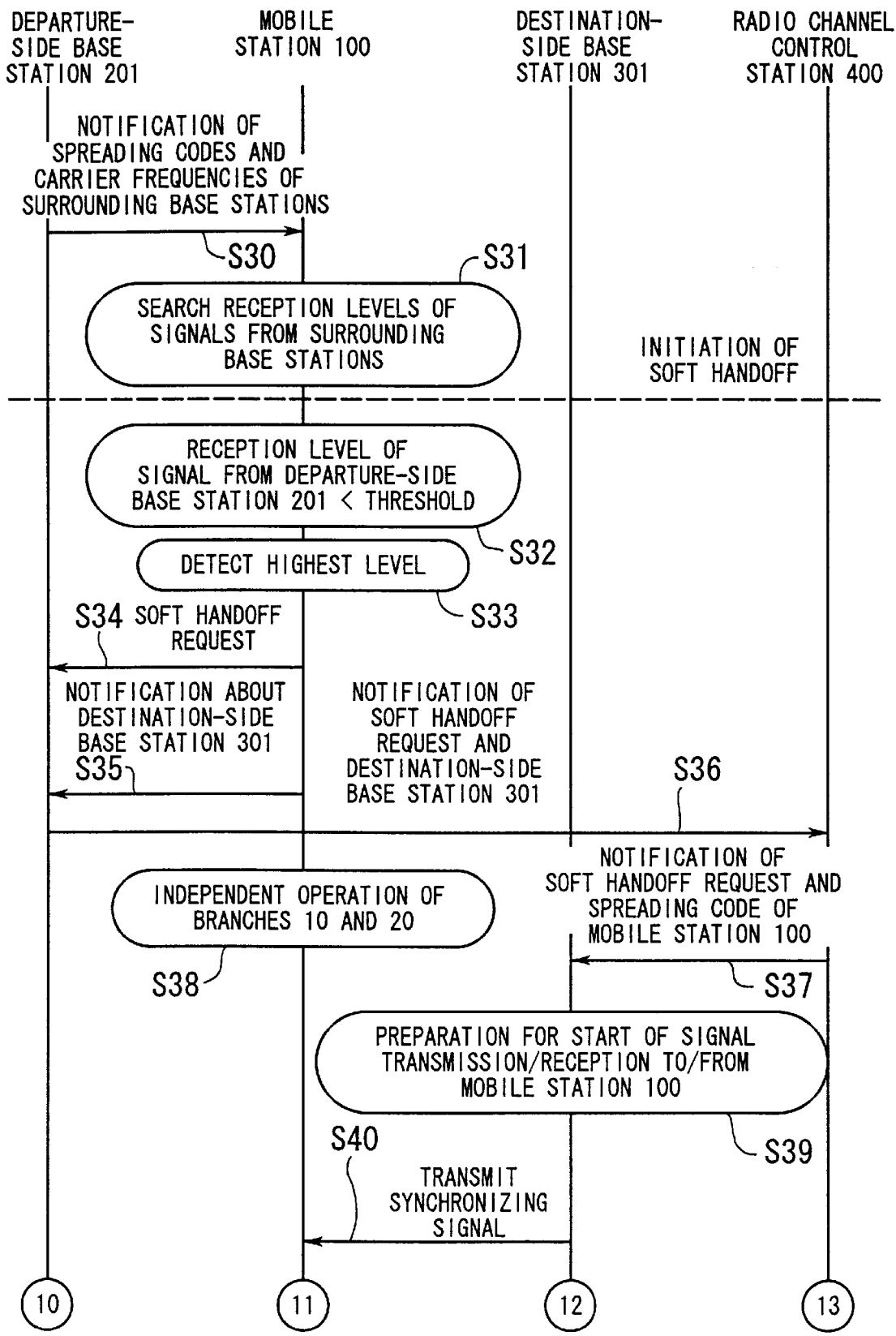
FIG. 8 is a first detailed sequence diagram illustrating the soft handoff method according to the present invention.
Figure 9:
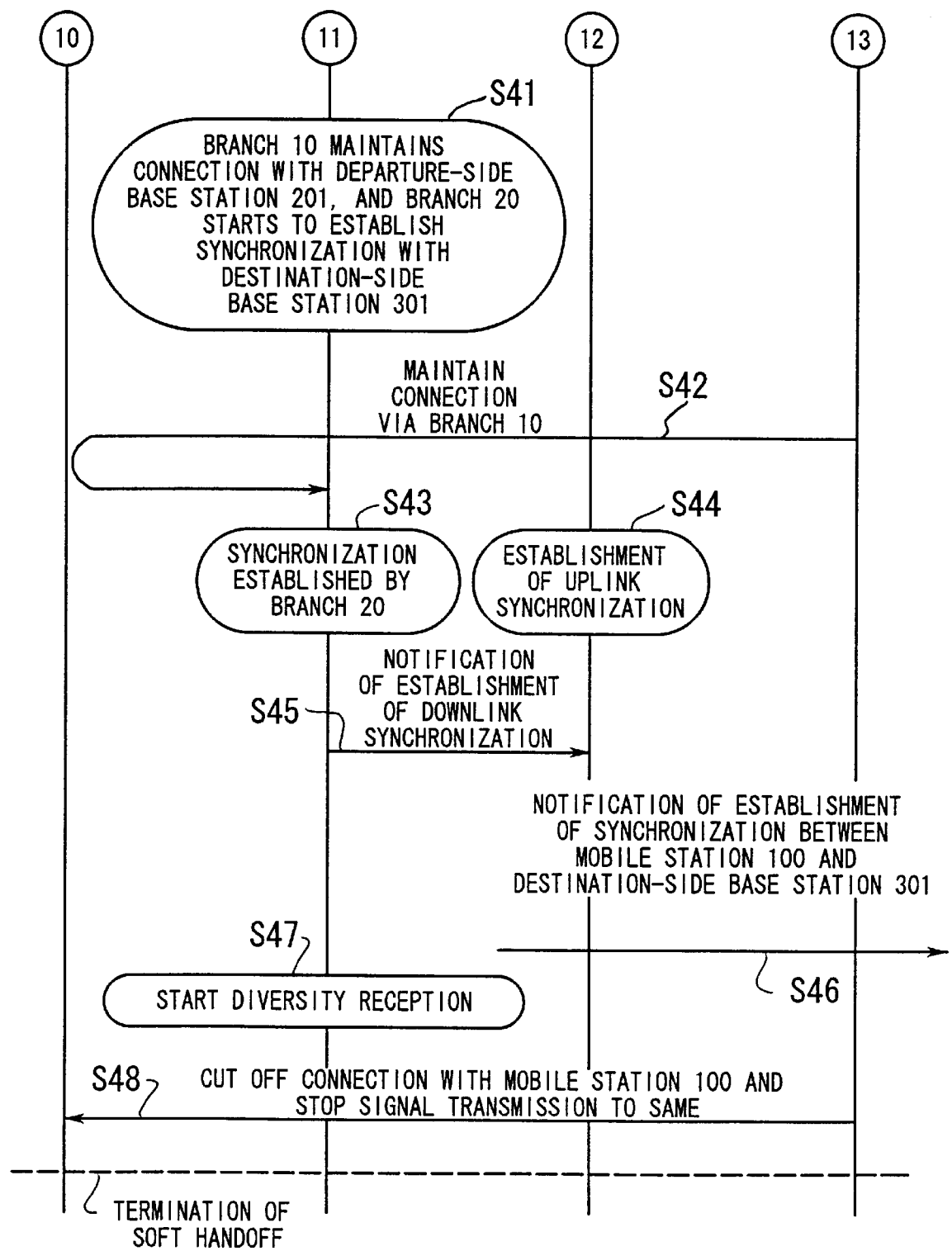
FIG. 9 is a second detailed sequence diagram also illustrating the soft handoff method according to the present invention.
Figure 10:
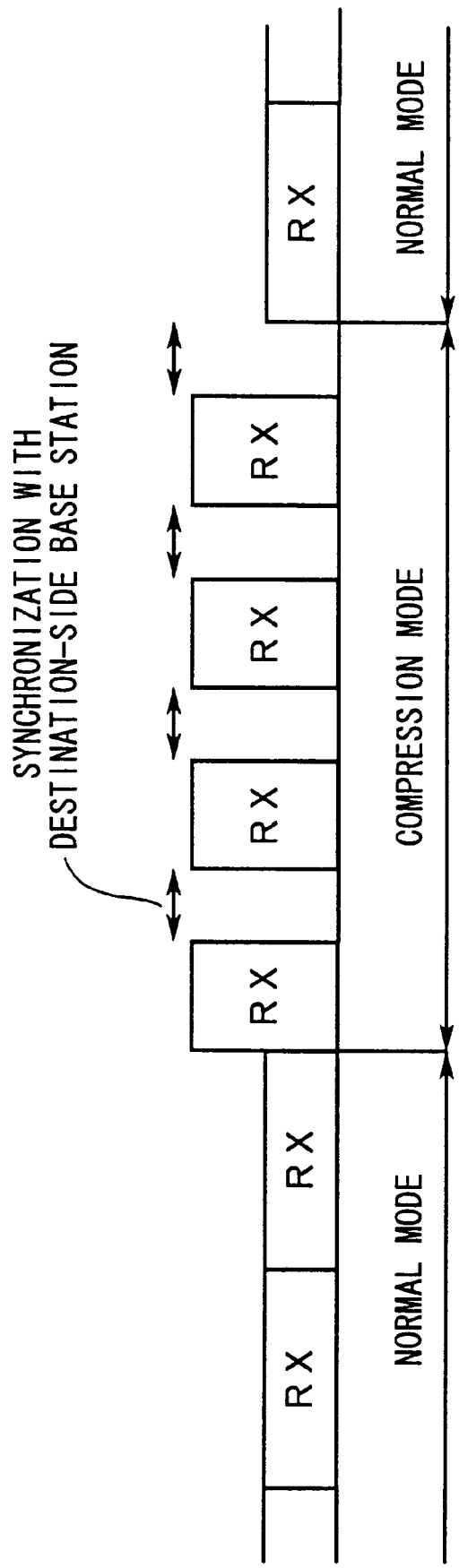
FIG. 10 is a diagram illustrating conventional soft handoff performed in a cell environment using different carrier frequencies.

The soft handoff method according to the present invention will be now explained in more detail. FIGS. 8 and 9 are detailed sequence diagrams illustrating the soft handoff method. It is here assumed that at the time of soft handoff, the branch 10 maintains the communication with the departure-side base station 201 while the branch 20 establishes synchronization with the destination-side base station 301.

[S30] The departure-side base station 201 notifies the mobile station 100 of the spreading codes and carrier frequencies of surrounding base stations.

[S31] On receiving the notification, the mobile station 100 searches the reception levels of signals from the surrounding base stations and initiates a soft handoff. Specifically, the mobile station 100 periodically operates the branches 10 and 20 independently of each other to cause one of the branches to sequentially measure the reception levels of signals from the surrounding base stations.

[S32] The mobile station 100 determines whether or not the reception level of the signal from the departure-side base station 201 is lower than a preset threshold.

[S33] The mobile station 100 detects a base station whose reception level is the highest, and identifies this base station as the destination-side base station 301. In this example, the branch 20 detects the base station of which the reception level is the highest.

[S34] The mobile station 100 notifies the departure-side base station 201 of a soft handoff request.

[S35] The mobile station 100 notifies the departure-side base station 201 of the identification number of the destination-side base station 301.

[S36] The departure-side base station 201 notifies the radio channel control station 400 of the soft handoff request and the identification number of the destination-side base station 301, both received from the mobile station 100.

[S37] The radio channel control station 400 notifies the destination-side base station 301 of the soft handoff request and the spreading code allocated to the mobile station 100.

[S38] In the mobile station 100, the branches 10 and 20 operate independently of each other.

[S39] The destination-side base station 301 prepares for the transmission of spreading code and carrier frequency to establish a channel connection with the mobile station 100 and for the reception of signal from the mobile station 100.

[S40] The destination-side base station 301 transmits a synchronizing signal, that is, the spreading code and the carrier frequency, to the mobile station 100.

[S41] While the branch 10 maintains the connection with the departure-side base station 201, the branch 20 starts to establish synchronization with the destinationside base station 301.

[S42] The radio channel control station 400 notifies the mobile station 100 via the departure-side base station 201 of maintenance of the connection by the branch 10.

[S43] In the mobile station 100, the branch 20 completes establishment of the synchronization.

[S44] In the destination-side base station 301, the synchronization of an uplink from the mobile station 100 to the destination-side base station 301 is established.

[S45] The mobile station 100 notifies the destination-side base station 301 of establishment of the synchronization of a downlink from the destination-side base station 301 to the mobile station 100.

[S46] The destination-side base station 301 notifies the radio channel control station 400 that establishment of the synchronization with the mobile station 100 has been completed.

[S47] The mobile station 100 starts diversity reception.

[S48] The radio channel control station 400 notifies the departure-side base station 201 of the cutoff of connection with the mobile station 100 and of the stop of radio signal transmission to the mobile station 100. At this point of time, soft handoff is terminated.

As described above, in the soft handoff method according to the present invention, the reception levels of signals from surrounding base stations are measured by using one of the branches 10 and 20 constituting the dual branch system of the mobile station 100 to detect the destination-side base station 301, then the branch 20, for example, establishes synchronization with the destination-side base station 301 while the branch 10 maintains the connection with the departure-side base station 201, and after the synchronization is established, diversity reception is performed. This permits soft handoffs to be carried out without entailing a reduction in the speech transmission capacity.

Although in the foregoing description, dual branch system is taken as an example, the present invention is applicable to triple or higher branch system.

As described above, in the mobile station according to the present invention, a plurality of branches are operated independently of one another under the control of the branch operation control section, and after a destination-side base station is detected by some branches through measurement of the reception levels of signals from surrounding base stations, part of the branches establish synchronization with the destination-side base station while the other part of the branches maintain the communication with the departure-side base station. After the synchronization is established, the communication with the departure-side base station is cut off. This permits soft handoffs to be carried out without entailing a reduction in the speech transmission capacity.

In the soft handoff method according to the present invention, a destination-side base station is detected by some of the branches in the mobile station through measurement of the reception levels of signals from surrounding base stations, then part of the branches establish synchronization with the destination-side base station while the other part of the branches maintain the connection with the departure-side base station, and after the synchronization is established, diversity reception is performed. Accordingly, it is possible to perform soft handoffs without entailing a reduction of the speech transmission capacity.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A mobile station for performing communication in a cell environment, where different carrier frequencies are used in adjacent cells, comprising:

first and second branches which operate independently of each other to receive radio signals from base stations and demodulate the received signals;

a diversity combining section which performs diversity combining of the two demodulated signals supplied by said first and second branches;

a selecting section which selects a signal from among the two demodulated signals supplied by said first and second branches and the diversity combined signal supplied by said diversity combining section;

a baseband signal processing section which reproduces a baseband signal from the signal selected by said selecting section and obtains information about a destination-side base station from the reproduced baseband signal; and a branch operation control section which controls operation of said first and second branches and said selecting section, including;

means for detecting the destination-side base station based on reception levels of the radio signals received from surrounding base stations, means, responsive to the detection of the destination-side base station, for causing said second branch to establish synchronization of spreading code and carrier frequency with respect to the destination-side base station, according to the information obtained by said baseband signal processing section, while using said first branch to maintain communication with a departure-side base station, and means for cutting off the communication with the departure-side base station after the synchronization is established between the destination-side base station and said second branch, and resuming the communication with the destination-side base station by directing said selecting section to select the diversity combined signal so as to perform diversity reception.

2. The mobile station according to claim 1, wherein said branches each comprise an antenna for receiving a radio signal from a base station, a synthesizer for outputting a carrier frequency used for modulation by the base station, a receiver for multiplying the radio signal by the carrier frequency to perform frequency conversion, and a spread spectrum demodulating section for subjecting an intermediate frequency output obtained as a result of the frequency conversion to spread spectrum demodulation.

3. The mobile station according to claim 1, wherein said branch operation control section periodically causes one of said branches to measure the reception levels of signals from surrounding base stations.

4. A soft handoff method for performing soft handoff in different cell environments, comprising the steps of:

detecting a destination-side base station by a mobile station based on reception levels of signals from surrounding base stations;

notifying a radio channel control station of a soft handoff request from the mobile station via a departure-side base station;

notifying the destination-side base station of the soft handoff request and a spreading code allocated to the mobile station, from the radio channel control station;

causing the destination-side base station to prepare for transmission of the spreading code and a carrier frequency to establish a channel to the mobile station and for signal reception from the mobile station;

operating a plurality of branches in the mobile station independently of one another for receiving the spreading code and the carrier frequency from the destination-side base station, in such a manner that while part of the branches maintain connection with the departure-side base station, another part of the branches initiate connection with the destination-side base station;

notifying the destination-side base station of establishment of synchronization of the spreading code and the carrier frequency and simultaneously causing the mobile station to resume diversity reception after said another part of the branches establish synchronization of the spreading code and the carrier frequency from the destination-side base station;

notifying the radio channel control station of the establishment of synchronization of the spreading code and the carrier frequency with respect to the mobile station, from the destination-side base station; and notifying the departure-side base station of cutoff of the connection with the mobile station, from the radio channel control station.

5. The soft handoff method according to claim 4, wherein the mobile station is notified of the spreading codes and carrier frequencies of surrounding base stations from the departure-side base station, whereupon the mobile station sequentially measures the reception levels of signals from the surrounding base stations and detects a base station whose reception level is highest as the destination-side base station.

* * * * *